(12) United States Patent
Koeniger et al.

(10) Patent No.: US 7,635,223 B2
(45) Date of Patent: Dec. 22, 2009

(54) LINEAR GUIDE DEVICE WITH SEPARATE CIRCULATORY UNITS

(75) Inventors: Berthold Koeniger, Werneck-Muehlhausen (DE); Bernhard Keller, Kaisten (DE)

(73) Assignee: Robert Bosch GmbH, Stuttgart (DE)

( * ) Notice: Subject to any disclaimer, the term of this patent is extended or adjusted under 35 U.S.C. 154(b) by 380 days.

(21) Appl. No.: 11/624,927

(22) Filed: Jan. 19, 2007

(65) Prior Publication Data

US 2007/0189646 A1    Aug. 16, 2007

(30) Foreign Application Priority Data

Feb. 15, 2006    (DE) .................. 10 2006 007 067

(51) Int. Cl.
*F16C 29/06*    (2006.01)
(52) U.S. Cl. ................................. 384/45
(58) Field of Classification Search ............ 384/43–45, 384/15
See application file for complete search history.

(56) References Cited

U.S. PATENT DOCUMENTS

| | | | | |
|---|---|---|---|---|
| 4,478,462 A | * | 10/1984 | Teramachi | 384/45 |
| 4,502,737 A | * | 3/1985 | Osawa | 384/45 |
| 4,586,758 A | | 5/1986 | Teramachi | |
| 4,595,244 A | * | 6/1986 | Teramachi | 384/15 |
| 4,643,591 A | | 2/1987 | Schwarz | |
| 4,775,247 A | | 10/1988 | Isert | |
| 4,798,479 A | * | 1/1989 | Morita | 384/45 |
| 4,869,600 A | * | 9/1989 | Tonogai | 384/43 |
| 2004/0071373 A1 | | 4/2004 | Keller et al. | |

FOREIGN PATENT DOCUMENTS

| | | |
|---|---|---|
| DE | 34 38 059 | 4/1986 |
| DE | 86 11 710 | 6/1986 |
| DE | 102 37 278 | 3/2004 |
| EP | 0 379 827 | 8/1990 |
| FR | 2 561 332 | 9/1985 |

OTHER PUBLICATIONS

Katalog: "Linearfuehrungen . . . " Druckschrift Lif Der Firma Ina, pp. 166-169, Sep. 4, 1998.

* cited by examiner

*Primary Examiner*—Thomas R Hannon
(74) *Attorney, Agent, or Firm*—Michael J. Striker

(57) ABSTRACT

A linear guide device, comprising a guide rail; a guide carriage displaceable on the guide rail and having at least one rolling body circuit with a circulatory channel for rolling elements and including a running channel, a return channel and two turnaround channels. The guide carriage has a base unit and at least two circulatory assemblies with at least one rolling body circuit and configured to be separate and interconnected only via the base unit. The guide carriage also has at least four recesses with orthogonal end faces, with two end faces on each side of the guide rail pointing in opposite directions.

11 Claims, 7 Drawing Sheets

LINEAR GUIDE DEVICE WITH SEPARATE CIRCULATORY UNITS

CROSS-REFERENCE TO A RELATED APPLICATION

The invention described and claimed hereinbelow is also described in German Patent Application DE 10 2006 007 067 filed on Feb. 15, 2006. This German Patent Application, whose subject matter is incorporated here by reference, provides the basis for a claim of priority of invention under 35 U.S.C. 119(a)-(d).

BACKGROUND OF THE INVENTION

The present invention generally relates to a linear guide device with separate circulatory units.

More particularly, the present invention relates to a linear guide device with a guide rail which extends in the guidance direction, and a guide carriage which is guided such that it is displaceable on the guide rail in the guidance direction using at least one rolling body circuit; the at least one rolling body circuit includes a circulatory channel and a large number of rolling elements which circulate in the circulatory channel; the circulatory channel includes a running channel which is bounded by a rolling body circuit formed in the guide rail and by a load-bearing wall section of the guide carriage, and it includes a return channel and two turnaround channels which connect the running channel with the return channel, in which the rolling elements are essentially load-free; the guide carriage includes a base unit and at least two circulatory assemblies.

A linear guide device of this type is made known, e.g., in DE 102 37 278 A1. In this case, two circulatory assemblies designed as plastic injection-moulded parts are placed on the base unit of the guide carriage, and they are connected with each other at each end of the guide carriage using an end plate. The end plate contains turnaround inserts which, since the circulatory assemblies are manufactured via injection moulding, cannot be provided integrally with the circulatory assemblies. In addition, the circulatory assemblies are installed on the base unit of the guide carriage in a force-transmitting manner using the end plate. This known linear guide device has the disadvantage that, although the circulatory assemblies can be used "as is" for guide carriages having different widths, an end plate adapted to each width must be provided.

It should be pointed out that reference is hereby expressly made to the contents of DE 102 37 278.0 and U.S. application Ser. No. 10/638,756, which was submitted with claim to the priority of this German patent application, to supplement the disclosure of the current application, in particular with regard for the basic design of the guide carriage.

An attempt is made to solve this problem using the linear guide devices made known on pages 166 through 169 of the catalog "Linearführungen, Profilschienenführungen, Laufrollenführungen, Wellenführungen" (Linear Guides, Rail Guides, Cam Roller Guides, Shaft Guides), publication LIF from the INA Company. The circulatory groups used there have the disadvantage, however, that, in order to provide a sufficiently stable guide, they are made of steel, and these steel circulatory groups are mounted on the base unit using screw bolts, which are difficult to install.

SUMMARY OF THE INVENTION

Accordingly, it is an object of the present invention to provide a linear guide device with separate circulatory units, which is a further improvement of the existing linear guide devices.

More particularly, it is an object of the present invention In contrast, the object of the present invention is to improve a generic linear guide device by ensuring that it can be easily adapted to guide carriages having different widths and lengths, but which are cost-favorable to manufacture and ensure easy installation of the circulatory groups and the guide carriage.

This object is attained according to the present invention by a generic linear guide device, with which the two circulatory groups are designed separately and are connected with each other only via the base unit, and at least four recesses are provided in the guide carriage, each of which includes an end face which extends essentially orthogonally to the guidance direction, against which one of the circulatory assemblies bears in the guidance direction; the end faces of two recesses each located on one side of the guide rail point in opposite directions.

By providing the recesses, the circulatory group of the inventive linear guide device can bear in the guidance direction against the end faces formed on the base unit, so that the force can be transferred between the circulatory group and the base unit preferably essentially entirely via this planar support. It is therefore not necessary to provide a mounting of the circulatory group on the base unit which is suitable for force transmission and which must therefore have a complex design.

According to the descriptions provided above, compared with the related art, a "base unit" is understood—per the present invention—to refer to the guide carriage without circulatory groups and end plates on the end faces. Based on this fact, among others, the circulatory groups are mounted directly on the base unit.

With an embodiment of the present invention, the recesses can be provided on both ends of the base unit; this ensures that the base unit will be particularly simple to manufacture.

In addition or as an alternative thereto, at least one recess can be provided in an essentially central region of the base unit. Several circulatory groups located one behind the other in the guidance direction can be provided on the guide carriage, for example, so that the circulatory groups of the inventive linear guide device can also be used with guide carriages having different lengths.

According to a further refinement of the inventive object, the circulatory groups are made at least partially of plastic, preferably via injection-moulding. The circulatory group can include a load-bearing wall section—made of metal—of the running channel, which bears against the base unit of the guide carriage, so that, even though the circulatory group is manufactured as a plastic part, a stable design and support of the running channel can be provided.

To ensure particularly simple mounting of the circulatory group on the base unit, it can be provided that each circulatory group includes several mounting segments which engage in openings of the base unit, and the end regions of which are deformable in order to rivet the circulatory group with the base unit. The mounting segments are preferably made of plastic.

To simplify the manufacture of a circulatory group, e.g., using injection moulding, it can be provided that each circulatory group includes a main part and two turnaround inserts.

Each of the turnaround inserts preferably bears in the guidance direction against the end face of the base unit and against a mounting segment, and/or a cover wall of the main part of the circulatory group, by way of which the turnaround inserts are fixed in position securely on the main part.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The first embodiment of the present invention which is shown in FIGS. 1 through 5 will be explained first.

Figure 3:
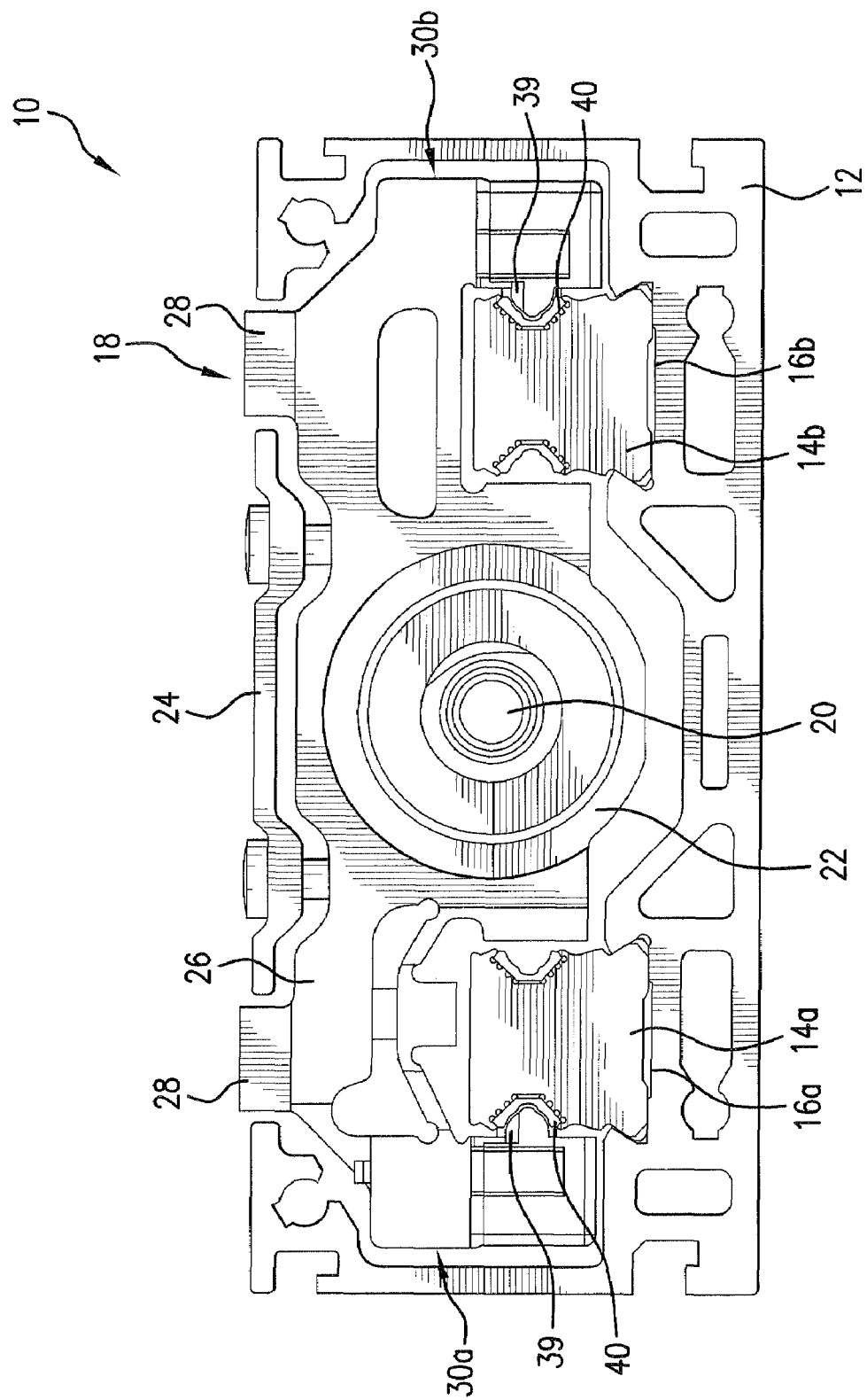
FIG. 3 is a front view of the linear guide device of the first embodiment of the present invention.
Figure 4:
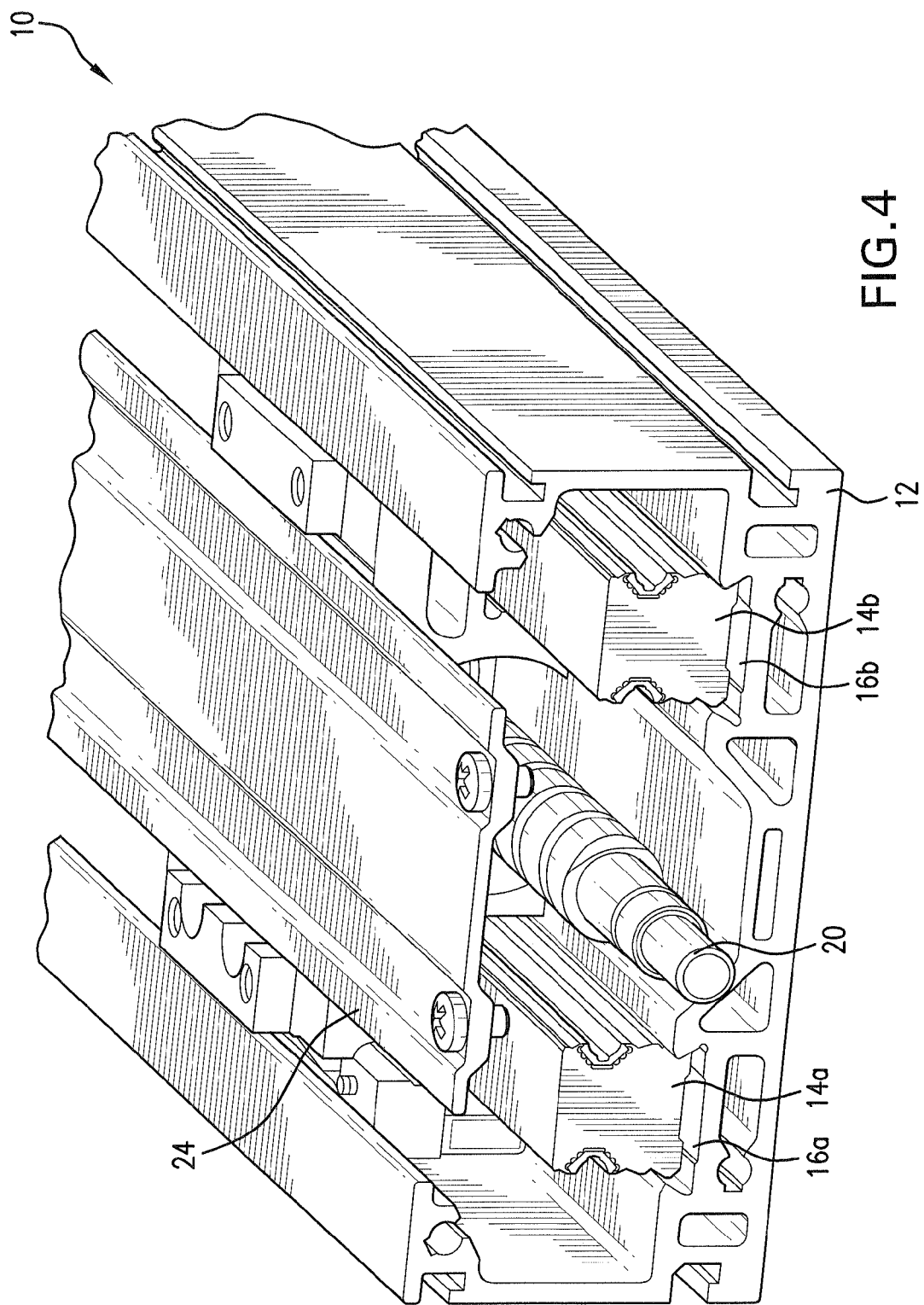
FIG. 4 is a perspective view of the guide housing of the linear guide device in FIGS. 1-3.

As shown in FIG. 3, a linear guide device 10 includes a guide housing 12, in which two guide rails 14a and 14b are fixed in position by staking a dovetail segment of guide rails 14a and 14b in grooves 16a and 16b in guide housing 12. A threaded spindle 20 is rotatably supported in guide housing 12 to drive a guide carriage 18 which is guided in guide housing 12 in a guidance direction. A counternut 22 fastened to guide carriage 18 is engaged with threaded spindle 20. A cover plate 24 is also secured to guide housing 12.

Guide carriage 18 includes a base unit 26, which is typically made, e.g., of aluminium, in particular an aluminium extruded profile section, which is provided with support sections 28 for securing an object to be moved by linear guide device 10, and legs 30a, 30a, each of which laterally encloses an associated guide rail 14a, 14b and is guided on this guide rail.

Each of the legs 30a, 30a of guide carriage 18 includes a rolling element circulatory assembly 32a, 32b. Each circulatory group 32a, 32b is riveted with base unit 26 using two mounting segments 34 (see FIGS. 1 and 2) by guiding mounting segments 34 through openings 36 in base unit 26, and then deforming the exposed end of mounting segments 34.

According to the present invention, guide carriage 18 and, in particular, circulatory groups 32a, 32b, are designed such that circulatory groups 32a, 32b can be provided as preassembled units, by including the rolling elements (not shown in FIGS. 1 through 5) which serve to guide guide carriage 12 on guide rail 14. Each circulatory group 32a, 32b includes a main part 48, which is preferably made as a plastic injection-moulded part, on which a trough-shaped element 42 is installed by being snapped into place, and two turnaround inserts 50 which are inserted in the main part such that they bear against a cover wall of main part 48 and mounting segment 34 which is integral with main part 48.

The rolling elements circulate in a rolling element circulatory channel 38 which is formed by a running channel 39, a return channel, and two turnaround channels. Running channel 39 is formed between guide carriage 18 and guide rails 14a, 14b, and is bounded by a running surface 40 on the side of guide rails 14a, 14b, and by a load-bearing section of a trough-shaped element 42 on the side of guide carriage 18. In return channel 44 which forms circulatory group 32a, 32b, the rolling elements return, load-free, to the beginning of running channel 39. Running channel 39 and return channel 44 are connected at both longitudinal ends in turnaround channels 46 formed in circulatory group 32a, 32b.

Figure 2:
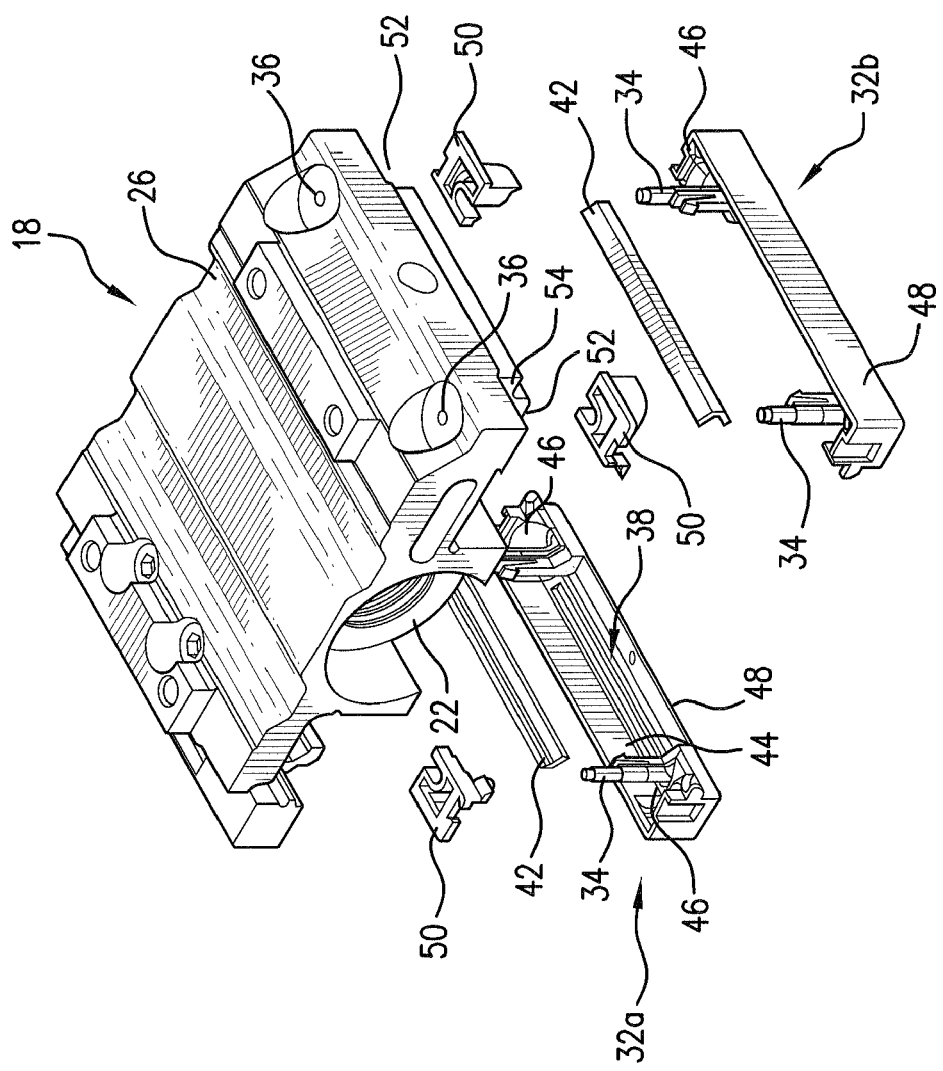
FIG. 2 is an exploded view of the guide carriage in FIG. 1.

As shown in FIG. 2 in particular, lower wall sections of return channel 44 and both turnaround channels 46 are formed on main part 48 of circulatory group 32a, 32b. Together with a steel wire—which is indicated in FIG. 2 using a dash-dotted line—the rolling elements are therefore enclosed by circulatory group 32a, 32b such that circulatory group 32a, 32b acts as a basket or shell, out of which the rolling elements do not fall.

Trough-shaped element 42 is preferably made of steel, so that it can easily withstand the stresses placed on its load-bearing wall. In the state in which it is joined with base unit 26, trough-shaped element 42 bears with its back side directly against base unit 26. In this manner, the forces of the load-bearing running channel 39 to be absorbed can be transferred directly to base unit 26.

Figure 1:
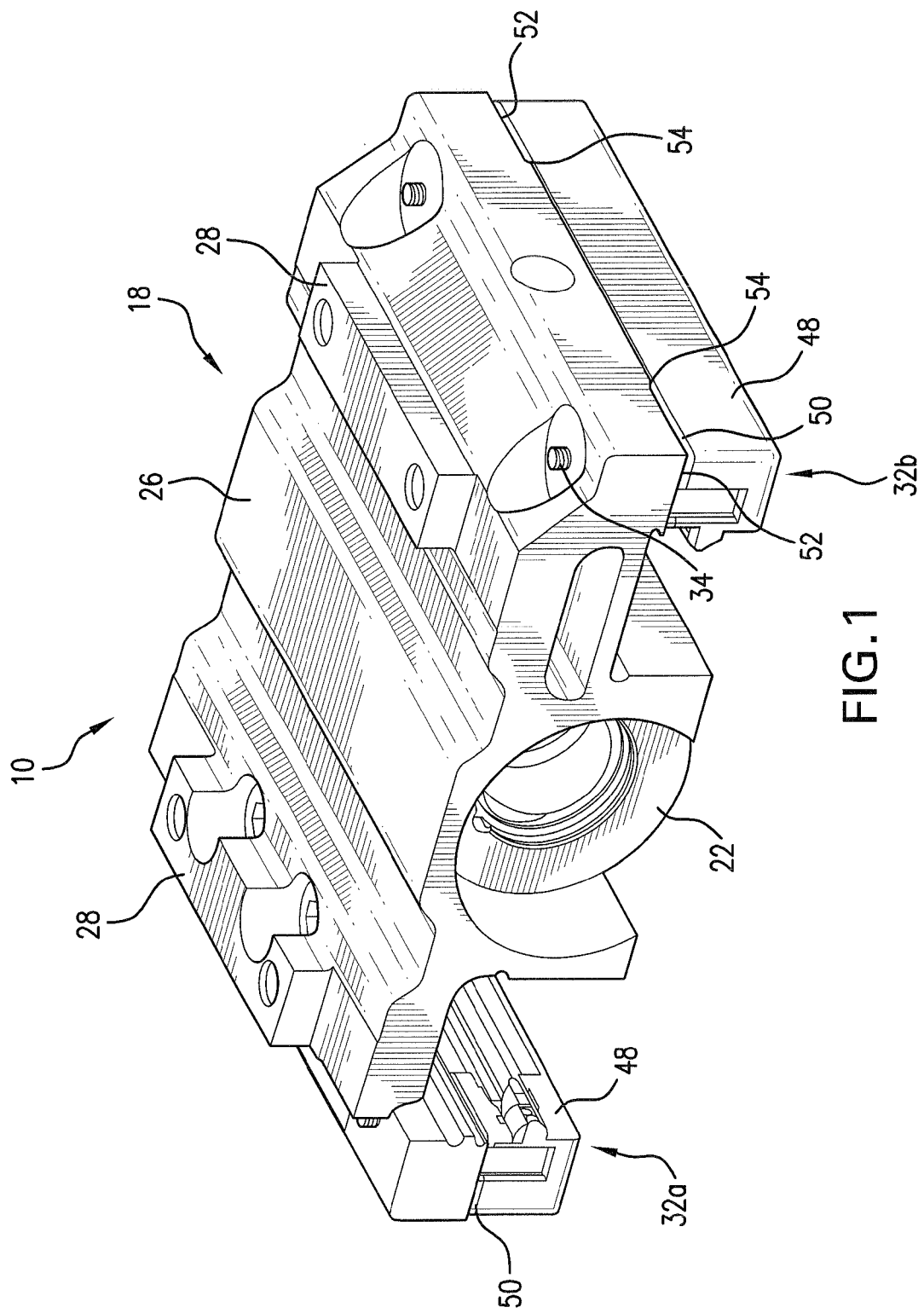
FIG. 1 shows a perspective view of a guide carriage of a linear guide device according to a first embodiment of the present invention.

Four recesses 52 are formed in the ends of base unit 26, the end faces 54 of which extend essentially orthogonally to the guidance direction. As shown in FIGS. 1 and 2 in particular, circulatory groups 32a, 32b bear via their turnaround inserts 50 against end faces 54 such that forces acting in the guidance direction or against the guidance direction can be transferred via this planar support directly from circulatory groups 32a, 32b to base unit 26.

This design makes it possible, with inventive linear guide device 10, to install circulatory groups 32a, 32b—at least part of which are manufactured as a plastic injection-moulded part—directly on base unit 26 of guide carriage 18 without installing an end plate in-between, since, given that circulatory groups 32a, 32b bear against end faces 54 of recesses 52, a stable transfer of force between circulatory groups 32a, 32b and base unit 26 is attained without placing stress on the attachment of circulatory groups 32a, 32b on base unit 26 via mounting segments 34.

It is therefore possible, with the linear guide device according to the present invention, to use the same injection-moulded main parts 48 and trough-shaped elements 42 of circulatory assemblies 32a, 32b, which are already used, e.g., for linear guide deices made known in DE 102 37 278 A1. It is only necessary to change turnaround inserts 50 of inventive circulatory groups 32a, 32b as compared with the circulatory groups made known in DE 102 37 278 A1, in which case they are connected with each other via an end plate with integrated turnaround inserts. As a result, the manufacturing cost for inventive circulatory groups 32a, 32b is minimized.

Figure 5:
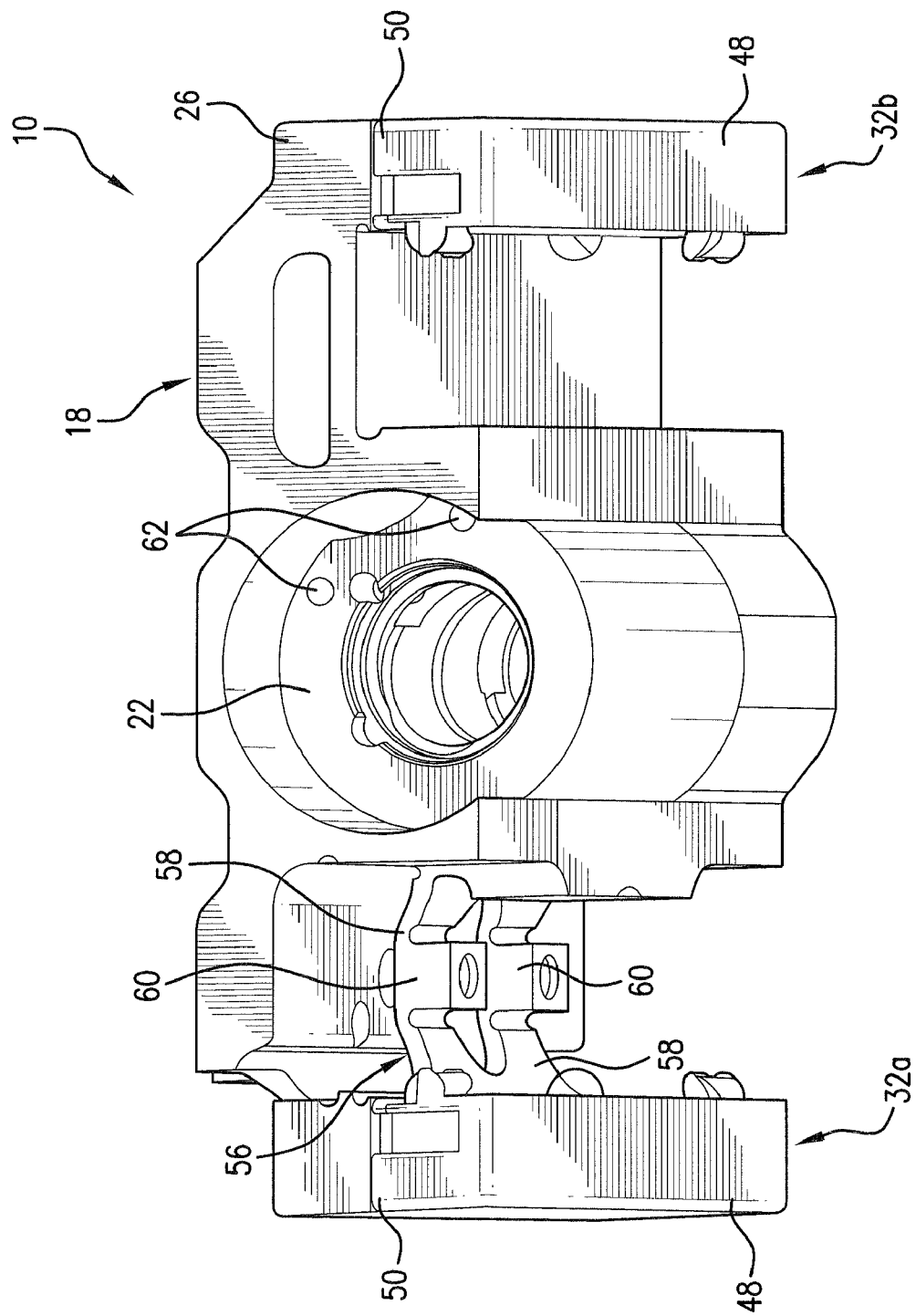
FIG. 5 is a further perspective view of the guide carriage according to the first embodiment of the present invention.

In addition, a preload-adjustment device 56 is assigned to a leg 30a of guide carriage 18 (FIG. 5). This preload-adjustment device 56 includes several knee joints 58 which are integral with base unit 26 of guide carriage 18. A not-shown adjustment screw bears against base unit 26 of guide carriage 18 and engages in a thread in an engagement part 60 of knee joint 58, so that the preload of legs 30*a*, 30*a* against guide rails 14*a*, 14*b* can be adjusted by rotating the adjustment screw.

As shown in FIG. 5, two bores 62 are formed on the end face of counternut 22, in which a matching tool can engage in order to screw counternut 22 via its (not shown) outer thread into the (not shown) thread of base unit 26.

Figure 6:
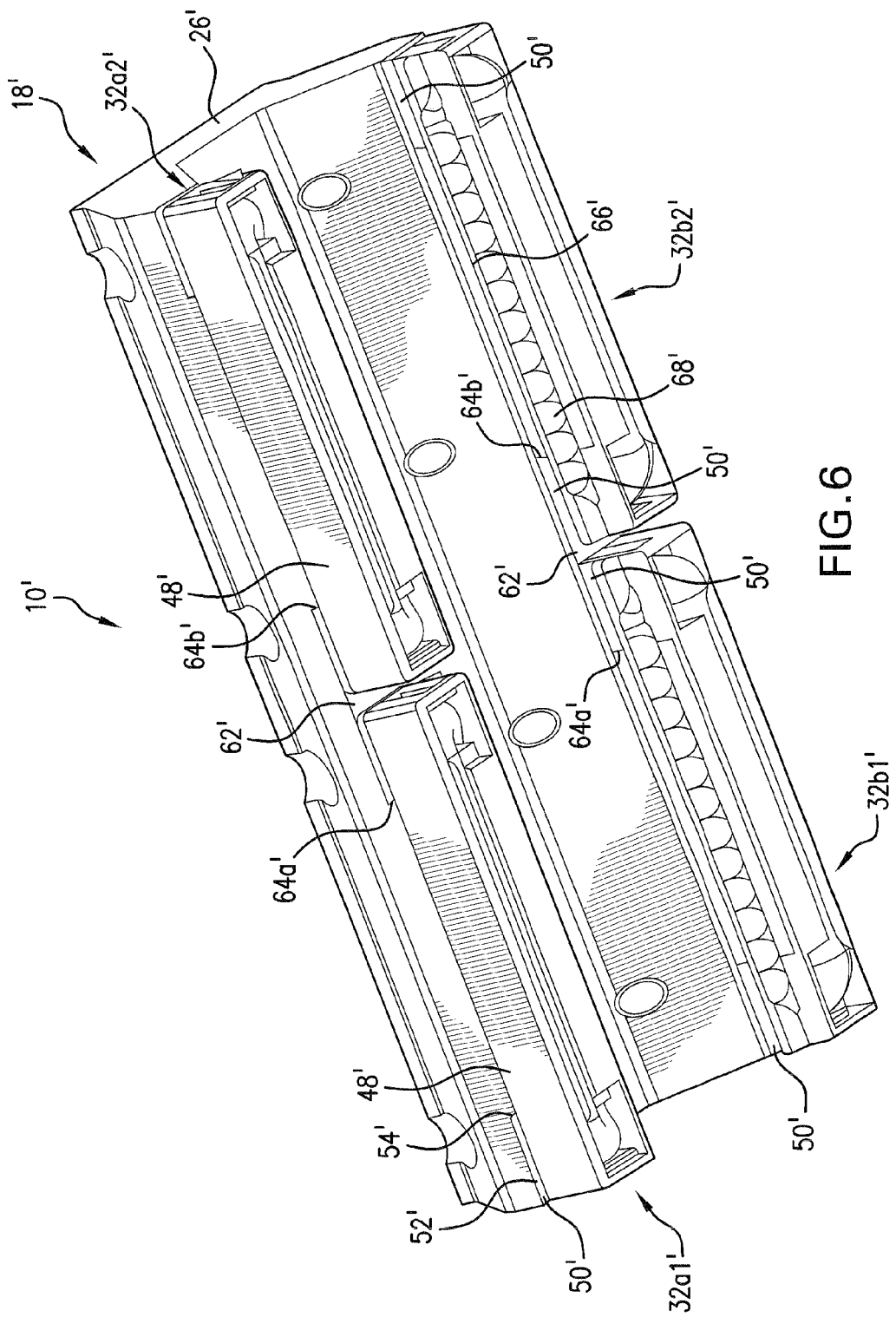
FIG. 6 shows a perspective view of a guide carriage according to a second embodiment of the present invention.

FIG. 6 shows a second embodiment of the present invention, in which two circulatory groups 32*a*1', 32*a*2', 32*b*1' 32*b*2' are provided on either side of base unit 26' and extend in the guidance direction. In order to support circulatory groups 32*a*1', 32*a*2' 32*b*1', 32*b*2' in the guidance direction and in the direction opposite thereto, an additional, central recess 62' with two end faces 64*a'*, 64*b'* is provided on both sides of base unit 26'. Each circulatory group 32*a*1', 32*a*2' 32*b*1', 32*b*2' therefore bears, via one side, against an end face 54' of recess 52' located on one end of guide carriage 18', and via its other side against an end face 64*a'*, 64*b'* of center recess 62'. As a result, circulatory groups 32*a*1', 32*a*2' 32*b*1', 32*b*2' can be used with guide carriages 18, 18' having different lengths or widths.

FIG. 6 also shows a retaining bracket 66' which is mounted on a main part 48' of circulatory groups 32*a*1', 32*a*2' 32*b*1', 32*b*2', which prevents rolling elements 68' from falling out of the running channel when guide carriage 18' is not installed on a guide rail. Instead of this retaining bracket, it is can be provided that the load-bearing wall section of the running channel formed in each circulatory group encloses the rolling elements around more than half of their circumference.

Figure 7:
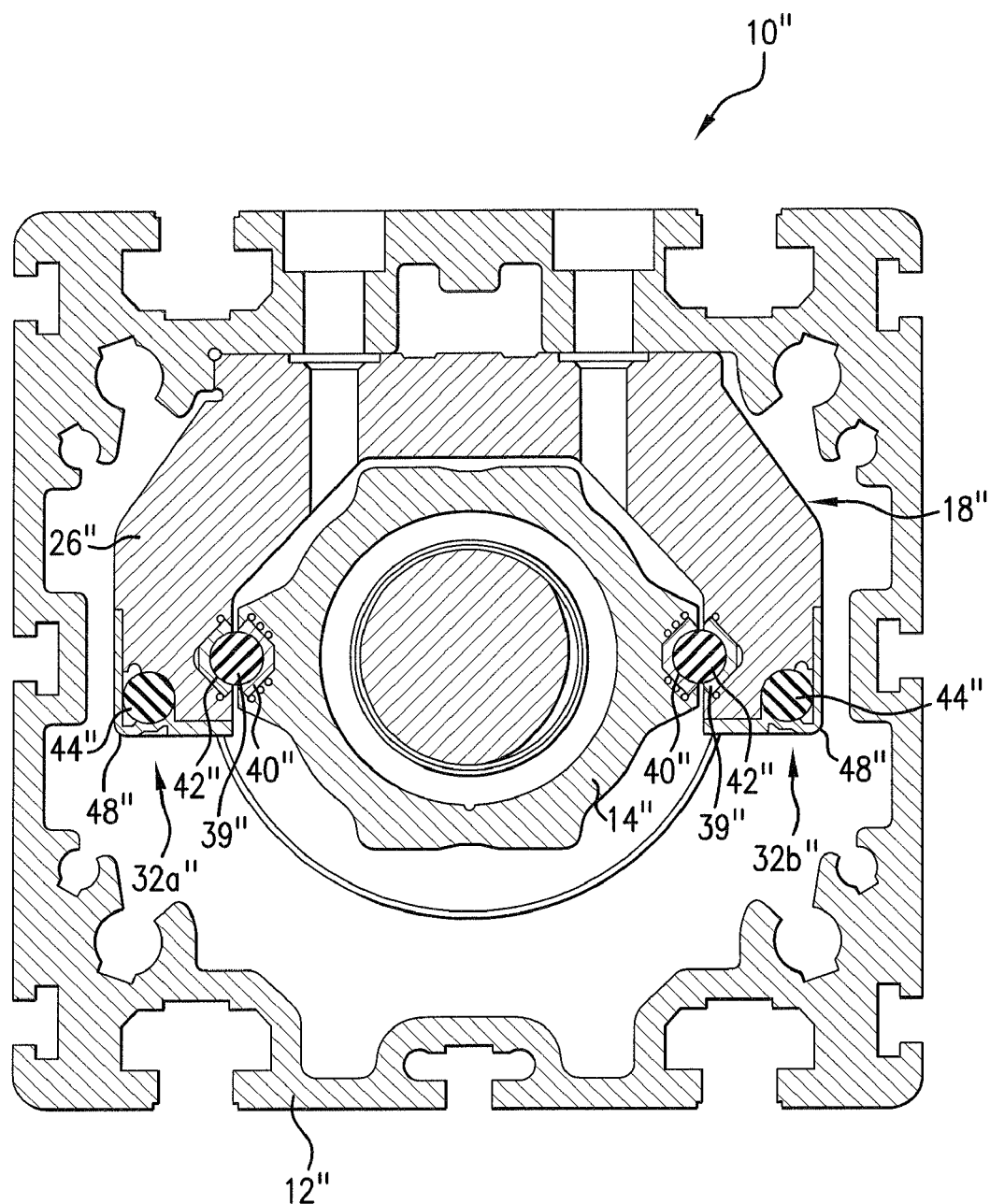
FIG. 7 is a sectional view of a linear guide device, which shows how the rolling element running channel rests on the base unit of the guide carriage in the manner according to the present invention.

FIG. 7 shows a cross section through a linear guide device 10", with which, instead of the guide rail, an arm element 14" is enclosed by guide carriage 18" and serves to illustrate how element 42"—which forms a wall of load-bearing running channel 39"—of circulatory groups 32*a"*, 32*b"* bears against base unit 26" of guide carriage 18". As a result, the forces transferred via the running channel between guide carriage 18" and guide rail 14" are absorbed by base unit 26" without the intermediate installation of main part 48" of circulatory group 32*a"*, 32*b"*, so that, despite the fact that main part 48"of circulatory groups 32*a"*, 32*b"* is designed as a plastic part, it is ensured that the guidance of guide carriage 18" on guide rail 14" is adequately stable.

It will be understood that each of the elements described above, or two or more together, may also find a useful application in other types of constructions differing from the type described above.

While the invention has been illustrated and described as embodied in a linear guide device with separate circulatory units, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A linear guide device, comprising a guide rail extending in a guidance direction; a guide carriage guided such that it is displaceable in said guided direction on said guide rail and having at least two rolling body circuits, each of said at least two rolling body circuits including a circulatory channel and a plurality of rolling elements which circulate in said circulatory channel, said circulatory channel including a running channel which is bounded by a rolling element track formed in said guide rail and by a load-bearing wall section of said guide carriage, said circulatory channel also including a return channel and two turnaround channels which connect said running channel with said return channel and in which said rolling elements are essentially load-free, said guide carriage including a base unit and at least two circulatory assemblies in each of which at least one of said at least two rolling body circuits is included, said two circulatory assemblies being configured to be separate and being interconnected only via said base unit, said guide carriage being provided with at least four recesses each having an end face which extends essentially orthogonally to said guidance direction and against which one of said circulatory assemblies bears in said guidance direction, said end faces of two of said recesses located on one side of said guide rail pointing in opposite directions.

2. A linear guide as defined in claim 1, wherein said recesses are arranged at both ends of said base unit.

3. A linear guide unit as defined in claim 1, wherein at least one of said recesses is arranged in a substantially central region of said base unit.

4. A linear guide unit as defined in claim 1, wherein said circulatory assemblies are located one behind the other in said guidance direction on said guide carriage.

5. A linear guide unit as defined in claim 1, wherein said circulatory assemblies are composed at least partially of a plastic material.

6. A linear guide unit as defined in claim 1, wherein said circulatory assemblies are composed at least partially of a plastic material and formed as injection molded assemblies.

7. A linear guide unit as defined in claim 1, wherein said circulatory assemblies include a load-bearing wall section of said running channel which is composed of metal.

8. A linear guide unit as defined in claim 1, wherein each of said circulatory assemblies includes mounting segments which engage in openings in said base unit, with end regions deformable in order to rivet said circulatory assemblies with said base unit.

9. A linear guide unit as defined in claim 8, wherein said mounting segments are configured as plastic mounting segments.

10. A linear guide unit as defined in claim 1, wherein each of said circulatory assemblies includes a main part and two turnaround inserts.

11. A linear guide unit as defined in claim 10, wherein each of said turnaround insert bears, in said guidance direction, against an end face of said base unit and against an element selected from the group consisting of a mounting segment, a closing wall of said main part, and both of said circulatory assembly.

\* \* \* \* \*